United States Patent [19]

Faust et al.

[11] 3,789,514
[45] Feb. 5, 1974

[54] BULKHEAD FILTER ASSEMBLY
[75] Inventors: Stewart W. Faust; L. Dean Kuhn, both of Newton, Iowa
[73] Assignee: The Maytag Company, Newton, Iowa
[22] Filed: July 24, 1972
[21] Appl. No.: 274,647

[52] U.S. Cl. .......................... 34/82, 34/133, 55/481, 55/509
[51] Int. Cl. ............................................ F26b 21/06
[58] Field of Search.... 34/79, 82, 133; 55/210, 214, 55/215, 274, 511, 509, 481

[56] References Cited
UNITED STATES PATENTS
| | | | |
|---|---|---|---|
| 3,378,934 | 4/1968 | Erickson | 34/82 |
| 3,718,982 | 3/1973 | Deaton | 34/82 |
| 2,722,750 | 11/1955 | Smith et al. | 34/133 |
| 3,263,343 | 8/1966 | Loos | 34/133 |

Primary Examiner—John J. Camby
Assistant Examiner—James C. Yeung
Attorney, Agent, or Firm—William G. Landwier; Richard L. Ward

[57] ABSTRACT

A removable filter assembly includes a perforate grid portion openly facing the interior of a tumbling chamber and effectively forming a portion of the stationary bulkhead engageable by the tumbling fabrics and further includes a fine mesh filter screen disposed in the path of air being drawn through the tumbling chamber. Lint and other particles removed from the airflow are collected on the fine mesh screen and trapped within the assembly between the perforate portion and the fine mesh screen which are removable from the bulkhead as a unit.

13 Claims, 5 Drawing Figures

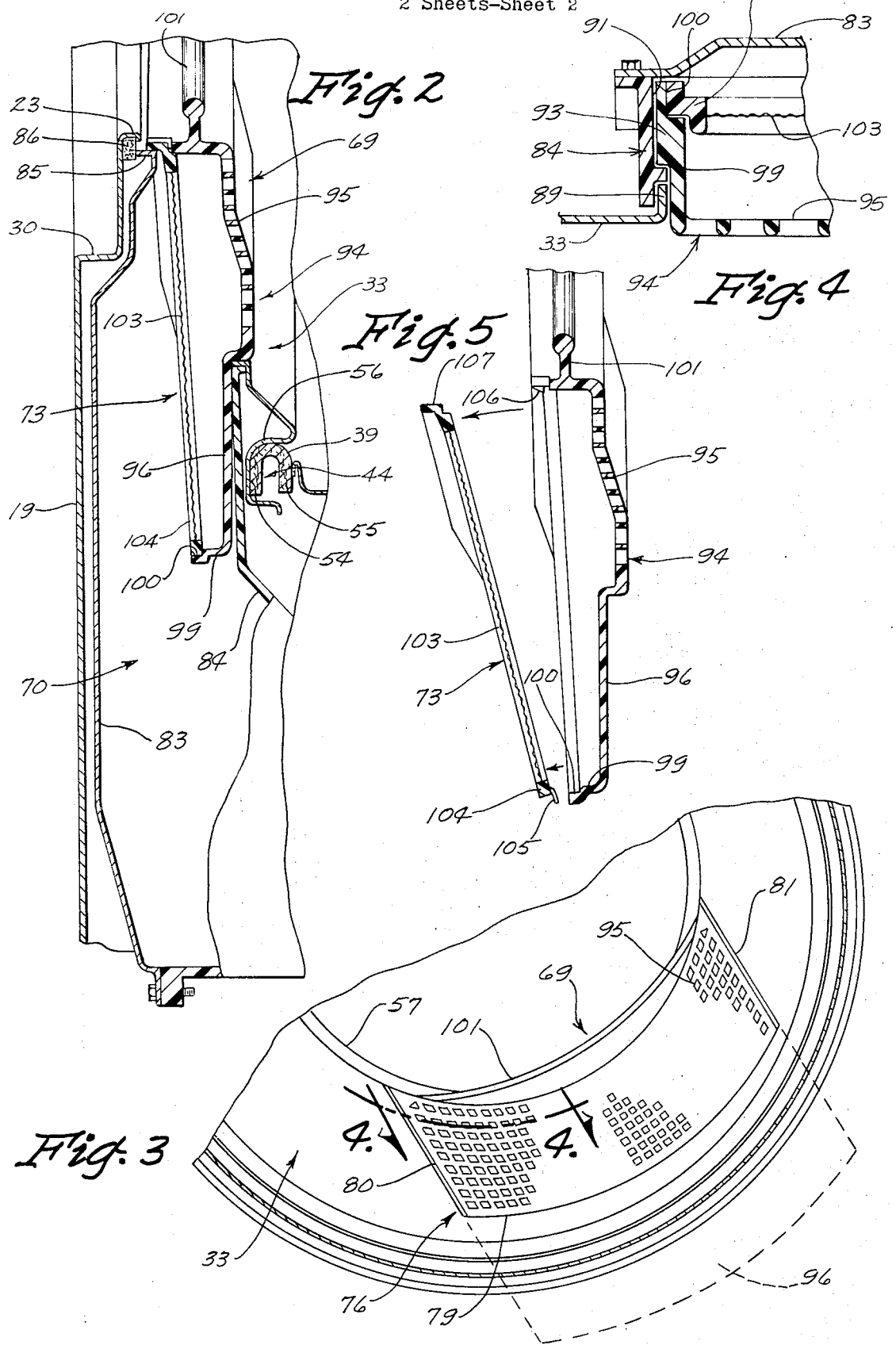

3,789,514

BULKHEAD FILTER ASSEMBLY

BACKGROUND OF THE INVENTION

1. Field of the Invention:

This invention is related to fabric drying apparatus and more particularly to a bulkhead filter assembly.

2. Description of the Prior Art:

Fabric dryers shown in prior art have commonly included a lint filter disposed in the airflow path for removing lint and other particles from the air before discharge of the air into the atmosphere. Such filters have been disposed at the rear of the drum, in the door, as separate drawers below the access, or in pockets recessed from the access opening. Those prior art filters associated with the access opening in which only the filter screen is removed have the disadvantage of lint falling from the filter screen as it is removed from the recess. Alternately, the constructions provided are awkward or difficult to clean. Furthermore, prior art constructions have occupied unreasonably large axial space necessitating increased cabinet size or decreased tumbler size. There is therefore a continuing need for an improved construction to accommodate an effective filter easily cleaned and occupying a relatively short axial space.

SUMMARY OF THE INVENTION

It is an object of the instant invention to provide an improved filter assembly disposed in a stationary bulkhead and removable as a unit for efficient cleaning.

It is a further object of the instant invention to provide an improved filter assembly disposed in a stationary bulkhead and including a perforate housing portion forming a portion of the bulkhead openly facing the interior of the tumbling chamber and removable from the bulkhead.

It is still a further object of the instant invention to provide a bulkhead filter assembly including a housing defining a perforate portion cooperatively disposed in a stationary bulkhead openly facing the tumbling chamber for contact by tumbling articles therein and further including a perforate screen mounted on the filter housing for filtering lint from the airflow and retaining the lint within the filter assembly for removal from the dryer apparatus.

The instant invention achieves these objects in a drying apparatus having a stationary bulkhead at the front of the machine in which is positioned a bulkhead filter assembly having a housing effectively forming a portion of the bulkhead and defining a perforate portion openly facing the tumbling chamber. A filter screen, disposed adjacent to the perforate portion for filtering particles from the air and retaining the particles within the assembly, is removable from the apparatus with the housing.

Operation of the device and further objects and advantages thereof will become evident as the description proceeds and from an examination of the accompanying two pages of drawings.

BRIEF DESCRIPTION OF THE DRAWINGS

The drawings illustrate a preferred embodiment of the invention with similar numerals referring to similar parts throughout the several views wherein:

FIG. 2 is an enlarged fragmentary view of a portion of the apparatus of FIG. 1 showing more particularly the bulkhead filter assembly of the instant invention;

FIG. 3 is a fragmentary view of the drying apparatus of FIG. 1 as indicated by lines 3—3 of FIG. 1;

FIG. 4 is a fragmentary sectional view of the filter assembly as taken along lines 4—4 of FIG. 3; and FIG. 5 is a view of the filter assembly removed from the drying apparatus showing the removal of the filter screen from the filter housing.

DESCRIPTION OF A PREFERRED EMBODIMENT

Figure 1:
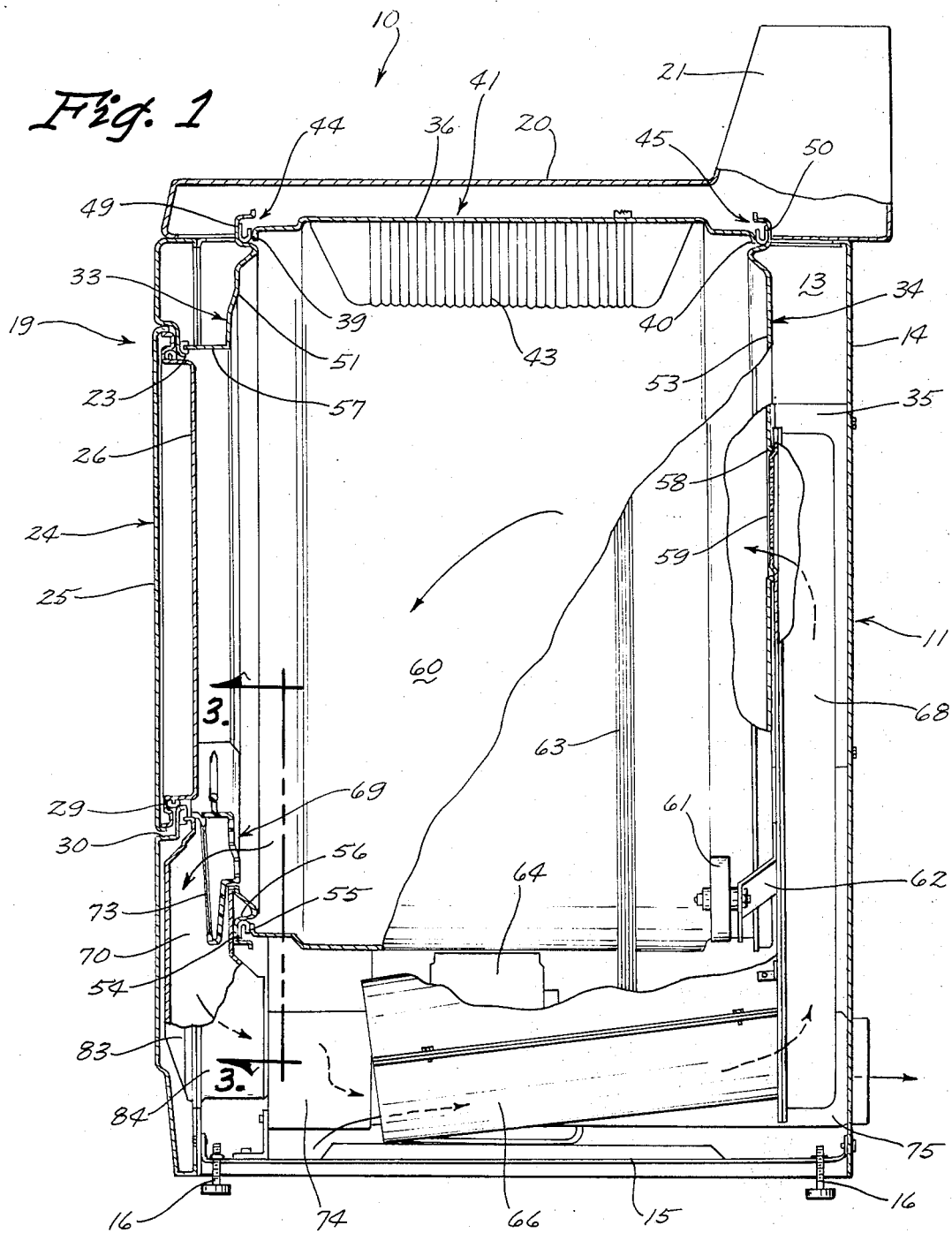
FIG. 1 shows an overall view of a fabric drying apparatus partially cut away and sectioned to show the instant invention embodied therein.

Referring to FIG. 1 there is shown the overall construction for a clothes dryer 10 including a cabinet assembly comprising a sidewall wrapper 11 having generally vertical opposite side panels 13 and a rear panel 14. The sidewall wrapper 11 is supported on a base 15 which in turn is supported on a horizontal surface through a plurality of adjustable feet 16. The cabinet assembly further comprises a front panel 19 and top cover 20 supported on the sidewall wrapper 11. The top cover 20 includes an upwardly extending housing 21 for accommodating selected controls for the dryer.

The front panel 19 defines a generally central access opening 23 and includes a door 24 hinged on the front panel and operable between open and closed positions relative to the access opening 23. The door 24 includes an outer panel 25 substantially flush with the front panel 19 and an inner panel 26 having a portion that extends rearwardly into the access opening 23. A seal 29 supported by the inner panel 26 extends endlessly around the rearwardly extending portion of the inner panel 26 for engagement with a recessed portion 30 of the front panel 19 to effectively provide an air seal at the access opening 23.

Disposed within the cabinet assembly is a pair of spacedapart generally vertical bulkheads 33 and 34. The rear bulkhead 34 is fixed to the sidewall wrapper 11 by a pair of brackets such as the bracket 35 that includes a front flange connected to the bulkhead and a rear flange connected with the rear panel 14. The front bulkhead is similarly connected to the front flanges of wrapper 11 with a pair of brackets.

A generally cylindrical peripheral sidewall 36 is disposed between the stationary bulkheads 33 and 34. At the front and at the rear of the peripheral sidewall 36 there are inwardly turned flanges comprising relatively short end walls 39 and 40 juxtaposed the front and rear bulkheads 33 and 34 and cooperable with the sidewall 36 to effectively define a fabric tumbler 41. A plurality of baffle members 43 are fixed to the peripheral sidewall 36 and extend into the tumbling chamber for assisting in the movement of fabrics therewithin during rotation of the fabric tumbler 41.

The front and rear bulkheads 33 and 34 include radially outwardly disposed recess portions 44 and 45 extending axially toward the front and toward the rear of the dryer 10, respectively. Seals 49 and 50 are fixed to the bulkheads 33 and 34 in the recesses 44 and 45 and are engageable with the tumbler end walls 39 and 40 to provide an air seal at the ends of the tumbler 41. The bulkheads 33 and 34 also include generally annular portions 51 and 53 extending inwardly from the recesses 44 and 45 that effectively provide extensions of the end walls 39 and 40 of the fabric tumbler 41.

The seal member 49, for example, disposed between the stationary bulkhead 33 and the rotatable tumbler 41 is shown as a U-shaped or channel-shaped felt member having a pair of generally outwardly extending legs 54 and 55 connected by an intermediate arcuate portion. The leg 54 is fixed, as with adhesive, to the stationary bulkhead 33 in the recess 44 so that the intermediate arcuate portion conforms generally to the corner radius 56 and effectively biases the other leg 55 into engagement with the front wall 39 of the tumbler 41. The felt may be coated on one side with an antifriction layer such as polytetrafluoroethylene to provide a smooth, more durable, and lower friction running surface for engagement with the tumbler end wall 39.

The front bulkhead 33 defines an access 57 into the tumbling chamber that is substantially axially aligned with the access opening 23 in the front panel 19. The rear bulkhead 34 defines an opening 58 to receive a perforate panel 59 through which airflow is directed into the tumbling chamber 60 from a duct system as will be shown.

The tumbler 41 is supported on a generally horizontal axis by a system including a pair of rollers 61 supported on brackets 62 fixed to the rear bulkhead 34 and by a pair of slide bearings (not shown) supported by similar brackets fixed to the front bulkhead 33. The tumbler 41 could be supported entirely on rollers or entirely on slides as conditions permit.

The fabric tumbler 41 is rotated by a belt 63 encompassing the periphery of the tumbler sidewall 36 and driven by a motor 64 mounted on the base 15.

The airflow system for the clothes dryer 10 includes a heater housing 66 supported adjacent the base 15 and into which air is drawn from the atmosphere for heating prior to movement into the fabric tumbling chamber 60. The heater housing 66 may accommodate either a gas or electric heating unit. The heater housing 66 is connected to a generally upwardly extending rear air duct 68 which conducts heated air from the heater housing 66 through the rear perforate panel 59 and into the tumbling chamber 60.

The air then flows from the chamber 60 through a filter assembly 69 into the front air duct 70. The filter assembly 69 includes a filter screen 73 supported within the air duct 70 for removing lint particles from the air flowing out of the tumbling chamber 60 into the front air duct 70.

The air is drawn from the front air duct 70 into a blower assembly 74 from which it is forced through a rearwardly extending lower air duct 75 to atmosphere. The blower 74 includes an impeller (not shown) that is driven by the motor 64 mounted adjacent to the blower 74 on the base 15. The general airflow pattern within the drying apparatus 10 is shown by the broken and solid line arrows in FIG. 1.

Referring to FIGS. 2, 3, and 4 the bulkhead filter assembly 69 is more clearly shown. The bulkhead 33 defines a cutout 76, the general outline being best shown in FIG. 3, extending generally radially and downwardly from the access opening 57 with the bottom 79 of the cutout generally parallel to the access opening and the two sides 80 and 81 generally parallel to each other.

The air duct 70 at the front of the machine, including the front housing 83 comprising a sheet metal stamping and the rear housing 84 comprising a plastic molding, joins with the bulkhead 33 around the cutout 76 to cooperatively define an egress from the tumbling chamber 60. An upper forwardly extending flange 85 of the front duct housing 83, as in FIG. 2, engages a felt seal 86 adjacent to the access opening 23 and a flange 89 of the bulkhead 33, as in FIG. 4, has overlapping and close fitting relationship with an offset in the rear duct housing 84 to complete the connection of the duct 70 to the bulkhead 33.

As best shown in FIG. 4, the rear housing 84 of the duct 70 includes a recess defining, in cooperation with the front housing 83, a guideway 91 to receive a shoulder portion 93 of the filter housing portion 94 as will be more fully shown hereinafter.

The filter assembly 69, shown in FIGS. 2 - 5, includes a housing portion 94 comprising a perforate grid portion 95 having a periphery conforming generally to the cutout 76 in the bulkhead 33 and defined by generally parallel arcuate limits corresponding generally to the curvature of said access opening 57 and a pair of opposite generally parallel sides corresponding to the cutout sides 80 and 81 and mating with the guideway 91 in said duct 70. The filter housing 94 includes the shoulder 93 along the outside of the parallel sides that is longitudinally tapered and engageable with the guideways 91 to properly position the filter assembly 69 in the duct 70 with the perforate portion 95 openly facing the interior of the tumbling chamber 60.

The filter housing 94 also includes an imperforate portion 96 disposed generally downwardly from the perforate portion 95 shown generally by the broken line outline in FIG. 3 and disposed within the duct 70 when the filter assembly 69 is in its operative position as in FIG. 2. Extending rearwardly from the combined periphery of the perforate and imperforate portions 95 and 96 is a flange 99 defining on its outer portion the shoulders 93 referred to hereinabove and defining on its interior surface a recess 100 for receiving the filter means 73. Extending upwardly from an upper portion of flange 99 is a handle 101 effectively disposed within said access opening 57 for removal of the filter assembly 69 from the air duct 70.

The filter means 73 includes a lint filter screen 103 and peripheral frame 104 that generally mates with the recess 100 in the rearwardly extending flange 99 of filter housing 94 and is thus supportable by the housing 94 in the air duct 70. The filter means 73 is removably retained in the recess 100 of the peripheral flange 99 by a pair of downwardly extending tabs 105 engageable with openings in the filter housing flange 99 and by a detent 106 extending downwardly from the upper filter housing flange 99.

As previously indicated the filter assembly 69 is removable from its operative position by gripping the upper handle 101 and sliding the assembly 69 toward the center of the access opening 57 so that the filter assembly 69, including the filter housing 94 and the filter means 73, is removed from the dryer apparatus as a unit. The lint is collected on the side of the filter screen 103 interior to the filter assembly 69 so that upon removal of the filter assembly 69 from the drying apparatus, lint is effectively trapped within the assembly. The filter means 73 is removed from the filter housing 94 by manually pressing down on the upper flange 107 of the filter frame 104 to disengage the upper portion of filter frame 104 from the detent 106. Upon removal of the filter means 73 from the filter housing 94 the lint collected on the filter screen 103 is easily removed.

It is thus realized that this filter assembly 69 is particularly advantageous for retaining the lint trapped while the assembly is removed from the drying apparatus. The filter means 73 is conveniently removable from the filter assembly for ease of cleaning the lint from the screen 103. The removal of the filter housing 94 permits access to the duct 70 if necessary. Furthermore it is noted that in the construction disclosed, in which the filter assembly 69 forms a portion of the bulkhead 33 openly facing the tumbling chamber 60, the axial space requirement for the filter assembly 69 and the associated ductwork is reduced to a minimum. The interior size of the tumbling chamber 60 is thus maximized while retaining a standard cabinet dimension.

In the drawings and specification there is set forth a preferred embodiment of the invention and although specific terms are employed these are used in a generic and descriptive sense only and not for purposes of limitation. Changes in form and the proportion of parts as well as the substitution of equivalents are contemplated as circumstances may suggest or render expedient without departing from the spirit or scope of this invention as defined in the following claims.

I Claim:

1. In a drying apparatus, the combination comprising: means defining a chamber for tumbling articles including a rotatable peripheral wall and a stationary bulkhead juxtaposed the front end thereof defining an access into said chamber, said bulkhead having an opening therein along and extending outwardly from said access; duct means cooperable with said bulkhead adjacent to said opening for forming a cavity openly facing said chamber and accommodating airflow from said chamber; door means for selectively closing said access; means for producing an airflow through said chamber and into said duct means; a filter housing removably located in said cavity, said filter housing comprising a perforate portion generally conforming to the limits of said opening and disposed therein openly facing said chamber for effectively providing a perforate bulkhead portion permitting airflow into said cavity while preventing passage of articles from said chamber; and a filter means removably supported on said filter housing and disposed within said cavity in the path of air flowing from said chamber for removing lint and particles from the air, said filter housing and said filter means being removable from said cavity as an assembly to remove said perforate portion from the arcuate opening in said bulkhead and to remove said filter means from said cavity.

2. In drying apparatus as defined in claim 1 wherein said filter means is separable from said filter housing for cleaning of lint therefrom upon removal of said assembly from said cavity.

3. In a drying apparatus, the combination comprising: means defining a chamber for tumbling articles including a rotatable peripheral wall and stationary bulkhead juxtaposed the front end thereof defining an access into said chamber, said bulkhead having an opening therein along and extending outwardly from said access; duct means joining with said bulkhead along said access and opening for forming a cavity openly facing said chamber and accommodating airflow from said chamber; door means for selectively closing said access; means for producing an airflow through said chamber and into said duct means; a filter housing removably located in said cavity, said filter housing comprising a perforate portion generally conforming to the limits of said opening and disposed therein openly facing said chamber for effectively providing a perforate bulkhead portion permitting airflow into said cavity while preventing passage of articles from said chamber; and a filter means removably supported on said filter housing and disposed within said cavity in the path of air flowing from said chamber for removing lint and particles from the air, said filter housing and said filter means comprising a bulkhead filter assembly removable as a unit from said cavity, said filter means being removable from said filter housing for cleaning of lint therefrom upon removal of said bulkhead filter assembly from said drying apparatus.

4. In a drying apparatus as defined in claim 3 wherein said perforate portion is arcuate and conforms generally to said opening to effectively form a continuation of said stationary bulkhead.

5. In a drying apparatus as defined in claim 3 wherein said filter means is connected to said filter housing in spaced juxtaposition to said perforate portion.

6. In a drying apparatus as defined in claim 3 wherein said duct means is connected to said bulkhead and defines a guideway for receiving and positioning said bulkhead filter assembly in an operative condition.

7. In a drying apparatus, the combination comprising: means defining a chamber for tumbling articles including a rotatable peripheral wall and stationary bulkhead juxtaposed the front end thereof defining an access into said chamber, said bulkhead having an arcuate opening therein generally below said access and extending generally radially from said access to adjacent said peripheral wall; duct means connected to said bulkhead along the boundary of said arcuate opening and cooperable with said bulkhead for forming a cavity openly facing said chamber and accommodating airflow from said chamber; door means for selectively closing said access; means for producing an airflow through said chamber and into said duct means; a filter housing removably located in said cavity, said filter housing comprising a perforate portion generally conforming to the limits of said arcuate opening and disposed therein openly facing said chamber for contact by the tumbling articles in said chamber and for effectively providing a perforate bulkhead portion permitting airflow into said cavity while preventing passage of articles from said chamber; and a filter means within said cavity removably connected to said filter housing in spaced juxtaposition to said perforate portion and disposed in the path of air flowing from said chamber for removing lint and particles from the air, said filter housing and said filter means comprising a bulkhead filter assembly removable as a unit from said cavity, said filter means being separable from said filter housing for cleaning of lint therefrom upon removal of said bulkhead filter assembly from said drying apparatus.

8. In a drying apparatus as defined in claim 7 wherein said perforate portion and said filter means are generally parallel to each other and wherein said filter housing includes an imperforate portion extending into said duct means to support a filter means substantially larger than said perforate portion.

9. In a drying apparatus as defined in claim 7 wherein said duct means defines a guideway for receiving and positioning said bulkhead filter assembly in an operative condition.

10. In a drying apparatus as defined in claim 7 wherein said filter housing includes handle means effectively disposed within said access for manually sliding said filter assembly out of said guideway into said access for removal from said drying apparatus.

11. In a drying apparatus as defined in claim 7 wherein said filter housing includes a transverse wall extending generally parallel to said bulkhead and defining said perforate portion openly facing said drying chamber, said filter housing further including a peripheral flange extending rearwardly from said transverse wall, said filter means including a peripheral frame generally mating with the peripheral flange of said filter housing and further including a lint filter screen supported by said frame for filtering particles from the air flowing through said perforate portion, the peripheral flange of said filter housing and peripheral frame of said filter means including cooperable means for detachably connecting said filter means and said filter housing together as a unit.

12. A bulkhead filter assembly as defined in claim 11 wherein said perforate portion is arcuate along said access and extends radially therefrom and effectively forms a continuation of said stationary bulkhead when said filter assembly is in its operative position.

13. A bulkhead filter assembly as defined in claim 11 wherein said filter means is disposed generally parallel to said perforate portion and extends radially beyond the limits of said perforate portion to form a substantially larger filter screen than said perforate portion.

* * * * *